United States Patent Office 2,791,586
Patented May 7, 1957

2,791,586

PROCESS FOR PREPARING N²-ACYL-N¹⁰-FORMYL PTEROYLGLUTAMIC ACID

Meyer Sletzinger, North Plainfield, and Max Tishler, Westfield, N. J., assignors to Merck & Co., Inc., Rahway, N. J., a corporation of New Jersey No Drawing. Application May 3, 1954,
Serial No. 427,336

6 Claims. (Cl. 260—251.5)

This invention relates to pteroylglutamic acid, commonly known as folic acid. More particularly, it is concerned with synthetic methods of producing pteroylglutamic acid and novel intermediates useful therein. This application is a continuation-in-part of our application Serial No. 334,382, filed January 30, 1953, now abandoned.

Pteroylglutamic acid, or vitamin Bc, occurs naturally in yeast, liver, grasses, and mushrooms. This substance has been found to be therapeutically effective in the treatment of macrocytic anemias, sprue, and other conditions of the circulatory system. Although pteroylglutamic acid can be isolated from natural sources, it has been found that chemical synthesis of the vitamin is a more desirable method of production. However, the syntheses of pteroylglutamic acid reported heretofore have not been entirely satisfactory due to low yields and inherent difficulties caused by the very low solubility of the intermediates employed.

It is therefore an object of this invention to provide a new and novel synthesis of pteroylglutamic acid. Another object is to provide a process for producing pteroylglutamic acid from readily available, inexpensive starting materials. A further object is to provide a process for producing pteroylglutamic acid wherein crystalline, soluble intermediates are employed. It is also an object to provide new and novel intermediates useful in preparing pteroylglutamic acid. Other objects will be apparent from the following detailed description of the invention.

According to a preferred embodiment of the present invention, it has been discovered that these objects and others can be achieved when pteroylglutamic acid is produced by the process which comprises reacting a 1,2-dihalo-1,3,3-trisubstituted propane wherein the 1,3,3 substituents are alkoxy, aryloxy or aralkoxy radicals (I) with a weak base to produce the corresponding 2-halo-3,3-dialkoxy, diaryloxy, or diaralkoxy propionaldehyde (II), condensing the resulting propionaldehyde with a 2,4,5-triamino pyrimidine substituted in the 6 position with a hydroxy, alkoxy, aryloxy, or aralkoxy radical (III) to produce a 2-amino-5,6-dihydropteridine of the formula

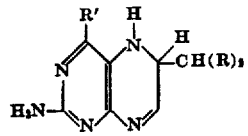

wherein R is an alkoxy, aryloxy, or aralkoxy radical and R' is a hydroxy, alkoxy, aryloxy or aralkoxy radical (IV), oxidizing the substituted 2-amino-5,6-dihydropteridine to the corresponding 2-amino pteridine (V), acylating the said substituted 2-amino pteridine to produce the corresponding 2-acylamino pteridine (VI) and subsequently hydrolyzing it to produce a 2-acylamino-4-hydroxy-6-formylpteridine (VII), reacting the 2-acylamino-4-hydroxy-6-formylteridine with L-(—1)N-(p-aminobenzoyl) glutamic acid to produce the Schiff's base N-{p-[(2-acyl-amino-4-hydroxy - 6 - pteridylmethylene) imino] benzoyl} glutamic acid (IX), reducing said Schiff's base to N²-acyl-N¹⁰-formyl pteroylglutamic acid (X), and hydrolyzing said compound to pteroylglutamic acid (XI). This sequence of reactions can be illustrated as follows:

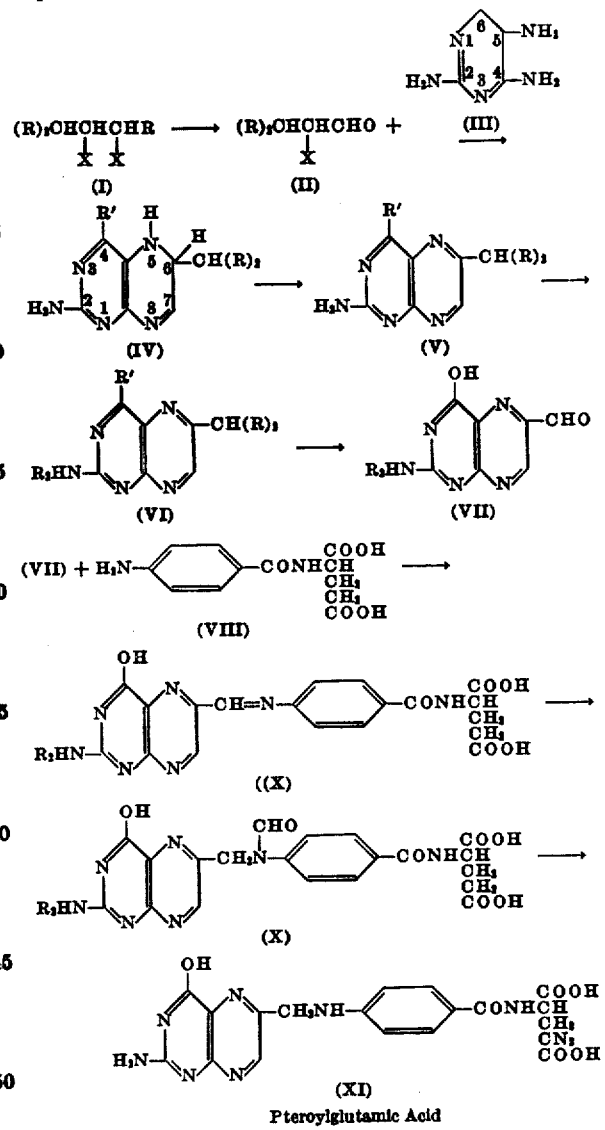

Pteroylglutamic Acid wherein X is a halogen, R is an alkoxy, aryloxy, or aralkoxy radical, R' is a hydroxy, alkoxy, aryloxy, or aralkoxy radical, and R² is an acyl radical.

The starting materials which can be used in practicing this invention are the 1,2-dihalo-1,3,3-trialkoxy propanes, 1,2-dihalo-1,3,3-triaryloxy propanes, and the 1,2-dihalo-1,3,3-triaralkoxy propanes. Such compounds are readily prepared by halogenating a 1,3,3-trialkoxy, triaryloxy, or triaralkoxy propylene-1 according to the method disclosed in the J. Am. Chem. Soc., 73, 206 (1951). For example, 1,2-dibromo-1,3,3-triethoxy propane is produced by reacting 1,3,3-triethoxy propylene-1 with bromine in an inert solvent. In a similar manner, 1,2-dibromo-1,3,3-tribenzyloxy propane is prepared by reacting acrolein dibromide with benzyl alcohol in the presence of hydrochloric acid to form 2-bromo-1,3,3-tribenzyloxy propane, reacting said compound with an inorganic base in the presence of benzyl alcohol to produce 1,3,3-tribenzyloxy propylene-1 which is then readily brominated to the desired 1,2-dibromo-1,3,3-tribenzyloxy propane. Other compounds which can be prepared according to this method by use of the corresponding alcohol and halogen are 1,2-dichloro-1,3,3-trimethoxy propane, 1,2-dichloro-1,3,3-tributoxy propane, and 1,2-dibromo-1,3,3-tripropoxy propane. After the reaction has been terminated the 1,2-dihalo-1,3,3-trisubstituted propane can be isolated from the reaction mixture and purified or the reaction mixture can be used directly as the starting material in our process without further processing.

In the first step of the process for preparing pteroylglutamic acid according to the preferred method of this invention, a 2-halo-3,3-dialkoxy, diaryloxy, or diaralkoxy propionaldehyde is produced by reacting the corresponding 1,2-dihalo-1,3,3-trialkoxy, triaryloxy, or triaralkoxy propane with a weakly basic substance. Examples of weak bases which are suitable for effecting the reaction are sodium acetate, sodium bicarbonate, ammonium hydroxide, and the like. The reaction is conveniently conducted in the presence of a suitable inert solvent or mixture of solvents. In general, hydroxylated solvents such as the alcohols are not used as the reaction medium since such solvents are not completely inert under the conditions of reaction. Some examples of solvents which can be used are water, dioxane, ether, chloroform, carbon tetrachloride, acetone, benzene and formamide. The reaction proceeds satisfactorily within a wide range of temperatures. Thus lowered temperatures of about 10° C. and elevated temperatures such as 80° C. can be used with good results. The resulting 2-halo-3,3-dialkoxy, diaryloxy, or diaralkoxy propionaldehyde can be recovered from the reaction mixture by conventional methods. Examples of the novel compounds which can be prepared by this process are 2-bromo-3,3-diethoxy propionaldehyde, 2-bromo-3,3-dibenzyloxy propionaldehyde, 2-chloro-3,3-dipropoxy propionaldehyde, and 2-bromo-3,3-dibutoxy propionaldehyde.

The pteridine moiety, which is an essential structural unit of pteroylglutamic acid, is produced by condensing a 2-halo-3,3-dialkoxy, diaryloxy, or diaralkoxy propionaldehyde with a 2,4,5-triamino pyrimidine having in the 6 position a hydroxy, alkoxy, aryloxy, or aralkoxy radical to produce the corresponding 2-amino-6-dialkoxymethyl, diaryloxymethyl, or diaralkoxymethyl-5,6-dihydropteridine. Fortunately, the resulting pteridine moiety is practically all the 6-methyl position isomer needed in the synthesis of biologically active compounds such as pteroylglutamic acid. The condensation is preferably effected by intimately contacting the reactants in the presence of a solvent and a condensing agent. The solvent can be water or an inert organic solvent or mixture of such solvents. Illustrative of solvents which can be used are hydroxylated solvents such as alcohols and glycols, particularly ethyl alcohol and ethylene glycol, and solvents such as acetone, benzene, and formamide. Examples of condensing agents which might be mentioned are sodium acetate, disodium phosphate, silver carbonate, and sodium formate. The reaction will proceed at ordinary temperatures but the rate of reaction may be increased by using elevated temperatures such as 60° C.

The condensation resulting in formation of the pteridine nucleus proceeds satisfactorily regardless of the substituent in the 6 position of the 2,4,5-triamino pyrimidine used as reactant. Thus, equally good results are obtained when the 6-substituent is a hydroxy, an alkoxy radical such as ethoxy, propoxy or butoxy, aryloxy radical such as phenoxy, or an aralkoxy radical such as benzyloxy. However, the condensation is most easily accomplished when a 2-halo-3,3-dialkoxy, diaryloxy, or diaralkoxy propionaldehyde is used in which the halogen is bromine or chlorine. In specific embodiments of this condensation 2-amino-4-benzyloxy-6-diethoxymethyl-5,6-dihydropteridine and 2-amino-4-hydroxy - 6 - diethoxymethyl-5,6-dihydropteridine can be produced by condensing respectively 2,4,5-triamino-6-benzyloxy pyrimidine and 2,4,5-triamino-6-hydroxy pyrimidine with 2-bromo-3,3-diethoxy propionaldehyde in the presence of aqueous ethanol and sodium acetate. After completion of the condensation the desired product can be recovered from the reaction mixture by conventional procedures or the reaction mixture can be used directly in the preparation of the fully aromatic pteridine moiety.

The fully aromatic 2-amino pteridines having a hydroxy, alkoxy, aryloxy, or aralkoxy radical in the 4 position and a dialkoxymethyl, diaryloxymethyl, or diaralkoxymethyl radical in the 6 position can be prepared by dehydrogenation of the correspondingly substituted 5,6-dihydropteridines. The dehydrogenation is readily accomplished by intimately contacting the 5,6-dihydropteridine with a mild oxidizing agent. Specific examples of suitable oxidizing agents are air, oxygen, iodine, and hydrogen peroxide with an iron catalyst. In general, it is preferable to maintain a pH of about 8 to 9 to obtain best results. In addition, the reaction is conveniently accomplished in a suitable inert solvent such as alcohols, glycols, acetone, benzene, formamide, dioxane, and water. The resulting pteridines can be isolated from the reaction mixture by conventional methods. According to specific applications of this dehydrogenation reaction 2-amino-4-benzyloxy-6-diethoxymethyl pteridine and 2-amino-4-hydroxy-6-diethoxymethyl pteridine are produced by oxidizing respectively 2-amino-4-benzyloxy-6-diethoxymethyl-5,6-dihydropteridine and 2 - amino-4-hydroxy-6-diethoxy-methyl-5,6-dihydropteridine with hydrogen peroxide and ferrous sulfate in a suitable solvent. Examples of other representative pteridines which can be prepared in this manner are 2-amino-4-butoxy-6-dibenzyloxymethyl pteridine, 2-amino-4-ethoxy-6-dimethoxymethyl pteridine, and 2-amino-4-methoxy-6-dipropoxymethyl pteridine.

In the next step of the process 2-amino pteridines containing a hydroxy, alkoxy, aryloxy, or aralkoxy substituent in the 4 position and a dialkoxymethyl, diaryloxymethyl, or diaralkoxymethyl substituent in the 6 position are converted to the corresponding novel 2-acyl-amino pteridines. The acylation can be effected by intimately contacting the substituted 2-amino pteridines with a suitable acylating agent such as an acyl halide or carboxylic acid anhydride. Acetyl chloride, propionyl chloride, butyryl chloride, benzoyl bromide, acetic anhydride, propionic anhydride, butyric anhydride, and benzoic anhydride are examples of suitable acylating agents. The acylation is conducted in a liquid reaction medium which can be an inert organic solvent or an excess of the acylating agent. In general, an added solvent is not required since the acylating agents are usually liquids at normal or slightly elevated temperatures. Although the reaction proceeds at ordinary temperatures it is usually effected at higher temperatures such as the reflux temperature to enhance the rate of reaction. The desired 2-acylamino pteridine can be isolated from the reaction mixture by conventional methods such as cooling and filtering to separate the crystalline product. According to this acylation procedure, 2-acylamino pteridines having the described substituents in the 4 and 6 positions can be readily prepared wherein the acyl substituent is an alkyl, aryl, or aralkyl carbonyl radical. Thus, some specific 2-acylamino pteridines which can be produced according to this process are 2-propionamido - 4 - benzyloxy - 6 - dimethoxymethyl pteridine, 2 - butyramido - 4 - hydroxy-6-dipropoxymethyl pteridine, 2-acetamido-4-phenoxy-6-diethoxymethyl pteridine, 2-acetamido - 4 - hydroxy-6-diethoxymethyl pteridine, 2-benzamido - 4 - hydroxy - 6 - diethoxymethyl pteridine, and 2 - phenylacetamido - 4-hydroxy-6-diethoxymethyl pteridine.

The acylated pteridines possess unique and valuable properties which distinguish them from the non-acylated pteridines. For example, the non-acylated pteridines reported in the art are amorphous compounds which are nearly insoluble in ordinary solvents. Therefore it was indeed surprising to discover that acylated pteridines, and derivatives of acylated pteridines, could be readily produced in crystalline form. Furthermore, the acylated pteridines were found to have an unexpectedly high solubility in water and many organic solvents. The ability to produce crystalline compounds with high solubility by the introduction of an acyl group on the 2-amino was entirely unexpected since pteridines having such desirable properties were heretofore unknown. This combination of desirable properties greatly enhances the usefulness of the 2-acylamino pteridines. Thus, the production of crystalline pteridines is a great aid in the purification of such compounds. Because of their greater solubility, the 2-acylamino pteridines can be used in reactions with smaller volumes of solvents than the nonacylated compounds thereby allowing a saving in material and permitting greater manipulative freedom.

In the next step of the process, 2-acylamino pteridines substituted in the 4 position with a hydroxy, alkoxy, aryloxy, or aralkoxy radical and in the 6 position with a dialkoxymethyl, diaryloxymethyl, or diaralkoxymethyl radical are hydrolyzed to the corresponding 2-acylamino-4-hydroxy-6-formyl pteridine. According to this hydrolysis reaction the acetal in the 6 position is converted to a formyl radical. Simultaneously pteridines which contain an alkoxy, aryloxy, or aralkoxy radical in the 4 position are hydrolyzed to the corresponding 4 hydroxy pteridines. Either mineral or organic acids can be used for the hydrolysis. Examples of some suitable acids are hydrochloric acid, sulfuric acid, phosphoric acid, acetic acid, and formic acid. The reaction is readily conducted in a solvent medium which can be an excess of the acid used or an added solvent such as water or an inert organic solvent. Normal or somewhat elevated temperatures may be used to promote the reaction. After the hydrolysis has been completed crystalline 2-acylamino-4-hydroxy-6-formyl pteridine is isolated by conventional methods. In specific applications of this reaction 2-acetamido-4-hydroxy-6-diethoxymethyl pteridine and 2-propionamido-4-benzyloxy-6-dimethoxymethyl pteridine are hydrolyzed with formic acid to 2-acetamido-4-hydroxy-6-formyl pteridine and 2-propionamido-4-hydroxy-6-formyl pteridine. Other similar compounds which can be prepared in this manner are 2-benzamido-4-hydroxy-6-formyl pteridine, 2-butyramido-4-hydroxy-6-formyl pteridine and 2-phenylacetamido-4-hydroxy-6-formyl pteridine.

In the succeeding step the Schiff's base N-{p-[(2-acylamino-4-hydroxy-6-pteridylmethylene) imino] benzoyl}-glutamic acid is produced by contacting the 2-acylamino-4-hydroxy-6-formyl pteridines with L(-1)N-(p-aminobenzoyl) glutamic acid in the presence of a solvent. In general, inert organic solvents can be used for the reaction medium. Some examples of suitable solvents are the alcohols such as methanol, ethanol, propanol and dioxane. The reaction can be carried out at room temperature or more elevated temperatures. By cooling the mixture after the reaction has been completed the desired Schiff's base crystallizes from solution and is recovered by conventional methods. According to this procedure N - {p - [(2 - acylamino - 4 - hydroxy - 6 - pteridylmethylene) imino] benzoyl}glutamic acids can be prepared wherein the acyl group is an alkyl carbonyl, aryl carbonyl or aralkyl carbonyl radical by selecting the corresponding 2-acylamino-4-hydroxy-6-formyl pteridines for the reaction. Representative of the broad class of Schiff's bases which can be prepared by this process are N - {p[(2 - acetamido - 4 - hydroxy - 6 - pteridylmethylene) imino] benzoyl}glutamic acid, N-{p-[(2-benzamido-4-hydroxy-6-pteridylmethylene) imino] benzoyl}glutamic acid and N - {p - [(2 - butyramido-4-hydroxy-6-pteridylmethylene) imino]benzoyl}glutamic acid.

According to the next step of the preferred process $N^2$-acyl-$N^{10}$-formyl pteroylglutamic acid is produced wherein the acyl substituent is an alkyl carbonyl, aryl carbonyl or aralkyl carbonyl radical by contacting the N-{p - [(2 - acylamino - 4 - hydroxy-6-pteridylmethylene) imino]benzoyl}glutamic acid with formic acid or a product which generates formic acid in situ. The reaction is conveniently conducted in the presence of a solvent. Examples of suitable solvents are the hydroxylated solvents such as the lower alcohols, dioxane, ether, and the inert chlorinated hydrocarbons. In addition, an excess of formic acid may be used for the reaction medium. A small amount of acetic anhydride is ordinarily added in effecting the reaction since it serves to promote high yields of the desired $N^2$-acyl-$N^{10}$-formyl pteroylglutamic acids. Although the reaction proceeds at ordinary temperatures the rate of reaction is increased at elevated temperatures. After the reaction has been completed the desired product can be isolated by cooling the reaction mixture and adding ether to precipitate the product. In one embodiment of this method $N^2$-acetyl-$N^{10}$-formyl pteroylglutamic acid is produced by reacting N-{p-[(2-acetamido-4-hydroxy-6-pteridylmethylene) imino]benzoyl}glutamic acid in dioxane with formic acid. Representative of other compounds which can be prepared according to this reaction by employing the appropriate Schiff's base are $N^2$-benzoyl-$N^{10}$-formyl pteroylglutamic acid, $N^2$-butyryl-$N^{10}$-formyl pteroylglutamic acid, $N^2$-propionyl-$N^{10}$-formyl pteroylglutamic acid and $N^2$-phenylacetyl-$N^{10}$-formyl pteroylglutamic acid.

According to the next and last step, pteroylglutamic acid is produced by hydrolyzing $N^2$-acyl-$N^{10}$-formyl pteroylglutamic acid with an inorganic or organic acid or base. It is preferred however, to employ the common inorganic acids and bases such as sodium hydroxide, potassium hydroxide, hydrochloric acid, sulfuric acid, and phosphoric acid. The reaction is run by intimately contacting the reactants in a suitable solvent such as water or an inert organic solvent. Elevated temperatures can be used, if desired, to promote the reaction. After the hydrolysis has been completed the pteroylglutamic acid is isolated from the reaction mixture by conventional methods.

Alternatively the $N^2$-acyl-$N^{10}$-formyl pteroylglutamic acid (X) can be produced by reduction of N-{p-[(2-acylamino-4 - hydroxy-6-pteridylmethylene) imino]benzoyl} glutamic acid (IX) with triethyl ammonium formate. The reaction is effected by intimately contacting the reactants at an elevated temperature, preferably at about 150° C. Although a solvent may be added it is generally preferred to use an excess of triethyl ammonium formate as the reaction medium. After the reaction has gone to completion the product is recovered by conventional methods such as adding water to precipitate the $N^2$-acyl-$N^{10}$-formyl pteroylglutamic acid and filtering. By following this procedure a large number of $N^2$-acyl-$N^{10}$-formyl pteroylglutamic acids can be prepared in which the acyl group is an alkyl, aryl, or aralkyl carbonyl radical. Examples of compounds which can be prepared in this fashion by using the appropriate Schiff's base are $N^2$-acetyl-$N^{10}$-formyl pteroylglutamic acid, $N^2$ - benzoyl - $N^{10}$ - formyl pteroylglutamic acid, $N^2$-butyryl-$N^{10}$-formyl pteroylglutamic acid, and $N^2$-phenylacetyl-$N^{10}$-formyl pteroylglutamic acid.

Pursuant to an additional embodiment of the invention it has been found that $N^2$-acyl-$N^{10}$-formyl pteroylglutamic acid (X) can be produced by intimately contacting 2-acylamino-4-hydroxy-6-formyl pteridine (VII) and L(-1)N-(p-aminobenzoyl) glutamic acid (VIII) in the presence of formic acid. This reaction can be illustrated as follows:

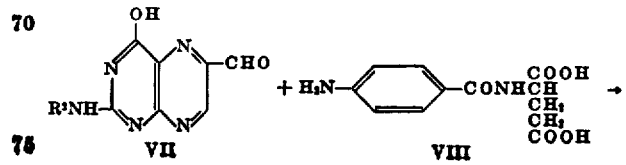

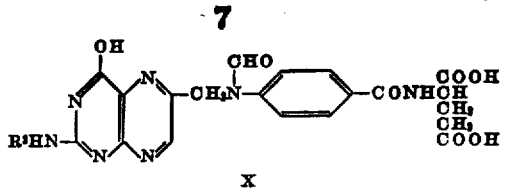

wherein R² is an alkyl carbonyl, aryl carbonyl, or aralkyl carbonyl radical. The reaction is effected in a suitable reaction medium which can be furnished by an added inert organic solvent or use of an excess of formic acid. Examples of solvents which can be used are dioxane and the lower alcohols such as ethanol and propanol. An elevated temperature, such as the reflux temperature, is preferably used to aid dissolution of the reactants and complete the reaction in a short period of time. In a specific embodiment of this process N²-acetyl-N¹⁰-formyl pteroylglutamic acid is produced by condensing 2-acetamido-4-hydroxy-6-formyl pteridine, L(-1)N-(p-aminobenzoyl) glutamic acid and formic acid in dioxane. In another specific application of this process N²-acetyl-N¹⁰-formyl pteroylglutamic acid is formed by reacting 2-acetamido-4-hydroxy-6-formyl pteridine with L(-1)N-(p-aminobenzoyl) glutamic acid in an excess of formic acid. Illustrative of other N²- acyl-N¹⁰- formyl pteroylglutamic acids which can be produced in this way are N²-propionyl-N¹⁰-formyl pteroylglutamic acid, N²-benzoyl-N¹⁰-formyl pteroylglutamic acid, and N²-phenylacetyl-N¹⁰-formyl pteroylglutamic acid.

According to a further embodiment of this invention N²-acyl-N¹⁰-formyl pteroylglutamic acid (X) is produced by reacting 2-acylamino-4-hydroxy-6-formyl pteridine (VII) with L(-1)N-(p-formamidobenzoyl) glutamic acid (XII). This reaction may be illustrated as follows:

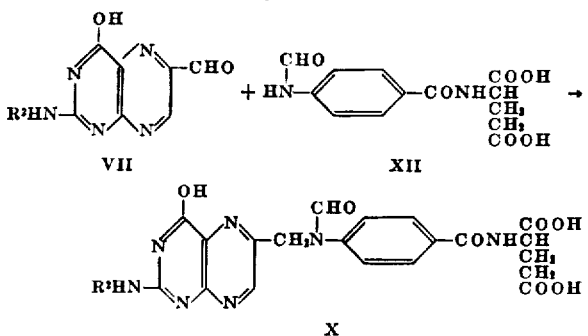

Wherein R² is an acyl group such as an alkyl carbonyl, aryl carbonyl, or aralkyl carbonyl radical. Examples of substituted pteridines which can be used in this reaction are 2-acetamido-4-hydroxy-6-formyl pteridine, 2-phenylacetamido-4-hydroxy-6-formyl pteridine, 2-benzamido-4-hydroxy-6-formyl pteridine, and 2-butyramido-4-hydroxy-6-formyl pteridine. Formation of the N²-acyl-N¹⁰-formyl pteroylglutamic acid is accomplished by intimately contacting the reactants in a suitable liquid reaction medium at an elevated temperature. Some suitable solvents in which to conduct the reaction are dioxane, the lower alcohols, water, and formic acid. In general, formic acid of approximately 98% purity has given the best results. Elevated temperatures of 60-100° C. have been found satisfactory although higher and lower temperatures may be used in special circumstances. In a specific embodiment of this reaction N²-acetyl-N¹⁰-formyl pteroylglutamic acid is prepared by condensing 2-acetamido-4-hydroxy-6-formyl pteridine with L(-1)N-(p-formamidobenzoyl) glutamic acid in 98% formic acid at about 70° C. The L(-1)N-(p-formamidobenzoyl) glutamic acid may be readily prepared by heating L(-1)N-(p-aminobenzoyl) glutamic acid with concentrated formic acid at a temperature of about 60-100° C.

It has further been found that a N²-acyl-N¹⁰-formyl pteroylglutamic acid (X) can be prepared by reacting a 2-acylamino pteridine having in the 4 position a hydroxy, alkoxy, aryloxy or aralkoxy radical and in the 6 position a dialkoxymethyl, diaryloxymethyl, or diaralkoxymethyl radical (VI) with L(-1)N-(p-aminobenzoyl) glutamic acid (VIII) and formic acid or a source of formic acid such as triethyl ammonium formate. Under such conditions the 6-acetal is converted in situ to a 6-formyl group. This reaction may be illustrated as follows:

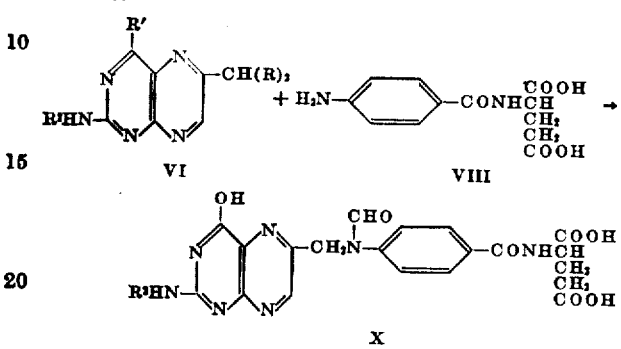

wherein R represents an alkoxy, aryloxy, or aralkoxy radical, R' represents a hydroxy, alkoxy, aryloxy, or aralkoxy radical, and R² is an acyl radical. The reaction is achieved by intimately contacting the reactants in a suitable solvent. The solvent can be an excess of formic acid or an added inert organic solvent, examples of which are dioxane, the lower alcohols, methyl cellosolve and the saturated hydrocarbons such as hexane. Elevated temperatures are used to promote the reaction, the range 70-100° C. having been found quite satisfactory. After the reaction is completed the product is isolated by ordinary procedures. In a specific application of this method N²-acetyl-N¹⁰-formyl pteroylglutamic acid is formed by reacting 2-acetamido-4-hydroxy-6-diethoxymethyl pteridine with L(-1)N-(p-aminobenzoyl) glutamic acid in 98% formic acid at about 70° C. Examples of other starting materials which can be reacted with L(-1)N-(p-aminobenzoyl) glutamic acid to produce the corresponding N²-acyl-N¹⁰-formyl pteroylglutamic acid are 2-acetamido-4-benzyloxy-6-dipropoxymethyl pteridine, 2-benzamido-4-phenoxy-6-dibenzyloxymethyl pteridine, and 2-phenylacetamido-4-propoxy-6-dimethoxy methyl pteridine.

In yet another embodiment of the invention N¹⁰-formyl pteroylglutamic acid (XIII) can be produced by reacting a non-acylated 2-amino pteridine having in the 4 positions a hydroxy, alkoxy, aryloxy, or aralkoxy radical and in the 6 position a dialkoxymethyl, diaryloxymethyl, or diaralkoxymethyl radical (V) with L(-1)N-(p-aminobenzoyl) glutamic acid (VIII) in an excess of formic acid. This reaction is illustrated as follows:

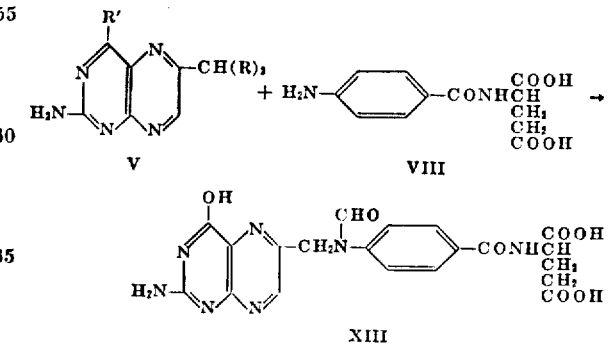

wherein R is an alkoxy, aryloxy, or aralkoxy radical, and R' is a hydroxy, alkoxy, aryloxy, or aralkoxy radical. Some specific examples of the substituted 2-amino pteridines which can be used as starting materials are 2-amino-4-methoxy-6-diethoxymethyl pteridine, 2-amino-4-phenoxy-6-dipropoxymethyl pteridine, 2-amino-4-benzyloxy-6-dibenzyloxy pteridine, and 2-amino-4-ethoxy-6-dimethoxymethyl pteridine. The reaction is conducted in an excess of substantially pure formic acid at an elevated temperature to promote the reaction, a satisfactory temperature being 70–80° C. It is preferred to employ 98% formic acid containing a small amount of acetic anhydride to obtain the highest yields. In a specific application of this process $N^{10}$-formyl pteroylglutamic acid is formed by reacting 2-amino-4-hydroxy-6-diethoxymethyl pteridine with L(-1)N-(p-aminobenzoyl) glutamic acid in an excess of formic acid at about 70° C.

In still another embodiment of the invention $N^{10}$-formyl pteroylglutamic acid and $N^2$-acyl derivatives thereof (X) can be prepared by reacting a 2-amino or 2-acylamino-4-hydroxy-6-formyl pteridine (VII) with L(-1)N-(p-aminobenzoyl) glutamic acid (VIII) in the presence of triethyl ammonium formate as a source of formic acid. This reaction can be illustrated as follows:

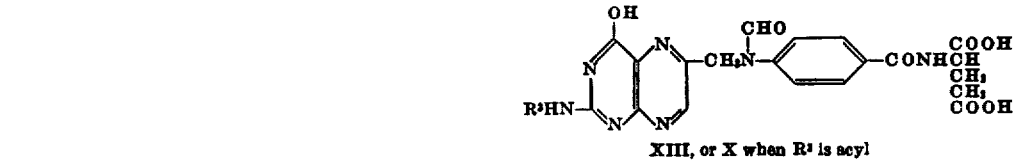

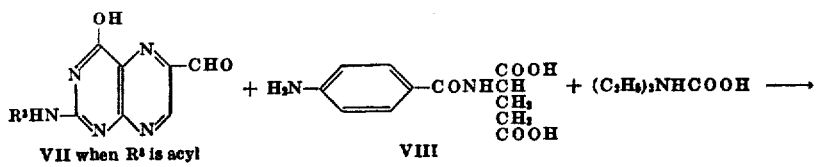

wherein $R^3$ represents a hydrogen or acyl radical. The starting materials which may be used in this reaction are 2-amino-4-hydroxy-6-formyl pteridine and derivatives thereof having an acyl radical in the 2 position which can be either an alkyl carbonyl, aryl carbonyl, or aralkyl carbonyl group. Examples of suitable starting materials in this class are 2-propionamido-4-hydroxy-6-formyl pteridine, 2-benzamido-4-hydroxy-6-formyl pteridine, 2-butyramido-4-hydroxy-6-formyl pteridine, and 2-phenylacetamido-4-hydroxy-6-formyl pteridine. The desired $N^{10}$-formyl pteroylglutamic acid or its $N^2$-acyl derivatives are formed by intimately contacting the reactants at an elevated temperature, for example 150° C. or above. Temperatures substantially below 150° C. are not preferred to effect the reaction. Atmospheric pressure or superatmospheric pressures can be employed. After the reaction is completed the reaction mixture can be worked up according to conventional methods to obtain the product. In a specific application of this reaction $N^{10}$-formyl pteroylglutamic acid is formed by reacting 2-acetamido-4-hydroxy-6-formyl pteridine with L(-1)N-(p-aminobenzoyl) glutamic acid in triethyl ammonium formate at 150° C.

In one other embodiment of this invention $N^2$-acyl-pteroylglutamic acid (XIV) can be produced by catalytic hydrogenation of the corresponding Schiff's base, N-{p-[(2 - acylamino-4-hydroxy-6-pteridylmethylene) imino] benzoyl} glutamic acid (IX). This reaction may be illustrated as follows:

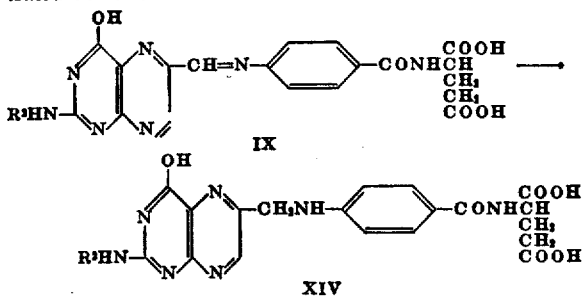

wherein $R^2$ represents an acyl group. The usual hydrogenation catalysts may be used to effect the reaction although it is preferred to use Raney nickel. The hydrogenation is conducted in a suitable reaction medium such as water, dioxane, glacial acetic acid, quinoline, a lower alcohol, and the like. Super atmospheric pressures are generally employed to aid the reaction. According to one embodiment of this process $N^2$-acetyl pteroylglutamic acid is produced by hydrogenating N-{p-[(2-acetamido-4-hydroxy-6-pteridylmethylene) imino] benzoyl}glutamic acid, with Raney nickel in water. By the procedure of this process other Schiff's bases such as N-{p-[(2-phenylacetamido-4-hydroxy-6-pteridylmethylene) imino] benzoyl}glutamic acid, N-{p-[(2-benzamido-4-hydroxy-6-pteridylmethylene) imino] benzoyl}glutamic acid, and N-{p-[(2-butyramido-4-hydroxy - 6 - pteridylmethylene) imino] benzoyl}glutamic acid are also reduced to the corresponding $N^2$-acyl pteroylglutamic acid. The resulting $N^2$-acyl pteroylglutamic acid may be readily hydrolyzed by an inorganic or organic acid or base to pteroylglutamic acid.

It has further been found that p-[N-(2-amino-4-hydroxy-6-pteridylmethyl) formamido] benzoic acid, commonly called rhizopterin, and $N^2$-acyl derivatives thereof (XV) can be readily produced by reacting a 2-amino or 2-acylamino pteridine having in the 4-position a hydroxy alkoxy, aryloxy or aralkoxy radical and in the 6 position a dialkoxymethyl, diaryloxymethyl, or diaralkoxymethyl radical (V or VI) with p-aminobenzoic acid and an excess of formic acid. This reaction may be illustrated as follows:

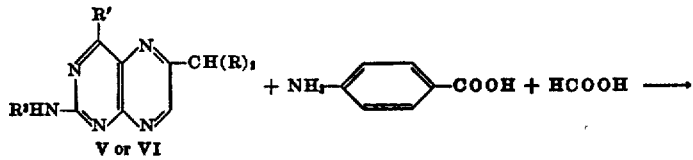

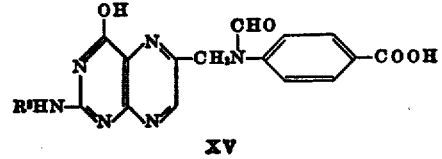

wherein R represents an alkoxy, aryloxy, or aralkoxy radical, R' represents a hydroxy, alkoxy, aryloxy, or aralkoxy radical, and R³ represents hydrogen or an acyl radical. Examples of pteridines within this class which are useful starting materials are 2-amino-4-methoxy-6-diethoxymethyl pteridine, 2-acetamido-4-phenoxy-6-dipropoxymethyl pteridine, 2-amino-4-benzyloxy-6-dibenzyloxymethyl pteridine, and 2-phenylacetamido-4-ethoxy-6-dimethoxymethyl pteridine. Formation of the desired p-[N-(2-amino-4-hydroxy-6-pteridylmethyl) formamido] benzoic acid or N²-acyl derivatives is conveniently achieved by intimately contacting the reactants at an elevated temperature. A temperature of 60–100° C. has been found suitable for this purpose at atmospheric pressure. The product may be recovered from the reaction mixture by conventional methods such as adding ether to precipitate the product.

The examples which follow illustrate methods of carrying out the present invention but it is understood, however, that these examples are not to be considered as limiting the invention.

EXAMPLE 1

Production of 2-bromo-3,3-diethoxy-propionaldehyde 1,2-dibromo-1,3,3-triethoxy propane was added to a solution of 27.6 gm. of sodium bicarbonate in a mixture of 30 ml. of water and 90 ml. of dioxane at a temperature below 10° C. After all the 1,2-dibromo-1,3,3-triethoxy propane was added, stirring was continued for 2 hours. The reaction mixture was extracted with ethyl ether and the ether extract washed with water and dried over anhydrous sodium sulfate. The ether solution was filtered and concentrated on a steam bath under reduced pressure to remove the solvent. The resulting liquid was fractionated through a distillation column. The yield was 26 gm. of 2-bromo-3,3-diethoxy propionaldehyde having a boiling point of 63–65° C. at 2.5 mm. of mercury; $n_D^{23.2°\ C.} = 1.4513$.

The 1,2-dibromo-1,3,3-triethoxy propane used as the starting material was prepared by reacting 50 gm. of 1,3,3-triethoxy-propylene-1 in 125 ml. of ether with 41 gm. of bromine while stirring and maintaining the temperature between 0–10° C. The solution was stirred for 1 hour at 0–10° C. and then the solvent removed under reduced pressure to produce a residue of 1,2-dibromo-1,3,3-triethoxy propane.

EXAMPLE 2

Production of 2-chloro-3,3-diethoxy-propionaldehyde

To a 100 ml. 3-necked flask equipped with stirrer, thermometer, and gas inlet was added 34.8 gm. of 1,3,3-triethoxy-propylene-1. It was cooled with stirring to about 5° C. and then 13.6 gm. of chlorine was bubbled through the liquid over a period of 45 minutes. The reaction mixture containing 1,2-dichloro-1,3,3-triethoxy propane was then added under nitrogen and with stirring to a mixture of 21 ml. of water, 62.5 ml. of dioxane, and 26.4 gm. of sodium bicarbonate. The reaction mixture was maintained at 5–10° C. and stirred for 2 hours. The reaction mixture was extracted twice with 50 ml. portions of ether. The combined ether extracts were washed with water and dried over sodium sulfate. The ether solution was filtered and removed under reduced pressure. The residue was distilled over calcium carbonate under reduced pressure to give 2-chloro-3,3-diethoxy-propionaldehyde having a boiling point of 58–60° C. at 1.2 mm. of mercury; $n_D^{35°\ C.} = 1.4309$.

In the same manner, 2-chloro-3,3-dipropoxy-propionaldehyde, 2-chloro-3,3-dibenzyloxy-propionaldehyde and 2-chloro-3,3-dibutoxy-propionaldehyde can be prepared by employing the corresponding 1,2-dichloro substituted propane.

EXAMPLE 3

Production of 2-amino-4-benzyloxy-6-diethoxymethyl-5,6-dihydropteridine

To a solution of 5 gm. of 2-bromo-3,3-diethoxy-propionaldehyde in 70 ml. of ethanol was added a solution of 2,4,5-triamino-6-benzyloxy pyrimidine in 70 ml. of ethanol containing 2 gm. of sodium acetate. The solution was stirred at room temperature for 15 minutes and subsequently heated at 60–65° C. for 1½ hours. The reaction mixture was cooled to room temperature and added to 700 ml. of water with stirring to prepare for purification of the product.

To the resulting slurry 2.5 N hydrochloric acid was added until the mixture became acidic. Insoluble matter that formed was removed by filtration. After cooling, the filtrate was added to an excess of 6 N ammonium hydroxide at a temperature of 5–10° C. The amorphous precipitate was removed by filtration and dried. The yield of 2-amino-4-benzyloxy-6-diethoxymethyl-,5,6-dihydropteridine was 3.5 gm.

A sample was purified further by dissolving it in ethyl acetate and adding n-hexane until the product precipitated.

EXAMPLE 4

Production of 2-amino-4-benzyloxy-6-diethoxymethyl pteridine

To an ethanol solution of 2-amino-4-benzyloxy-6-diethoxymethyl-5,6-dihydropteridine was added 50 mg. of ferrous sulfate in 1 ml. of water and then 2.3 gm. of 30% hydrogen peroxide in 10 ml. of water was added over a 30 minute period. The mixture was concentrated under reduced pressure to a small volume and 2.5 N hydrochloric acid added to dissolve most of the oil. The solution was separated from insoluble material by decantation and added to an excess of cold 6 N ammonium hydroxide. A precipitate resulted which was isolated and dried. The yield of 2-amino-4-benzyloxy-6-diethoxymethyl pteridine was 4 gm. and its ultraviolet absorption spectrum in 0.1 N NaOH had maxima at 2560 A (E% =369) and 3610 A (E% =210); in 0.1 N HCl it had a maximum at 3350 A (E% =364).

By a paper strip chromatography, run according to the procedure of Weygand in Experientia 6, 184 (1950), of the acid obtained by permanganate oxidation of 2-amino-4-hydroxy-6-formyl pteridine which was produced by acetal hydrolysis of 2-amino-4-benzyloxy-6-diethoxymethyl pteridine, it was found that the product was all the desired position 6 isomer.

The solution of 2-amino-4-benzyloxy-6-diethoxymethyl-5,6-dihydropteridine used in this example was prepared by reacting 4.6 gm. of 2,4,5-triamino-6-benzyloxy pyrimidine and 1.8 gm. of sodium acetate in 63 ml. of ethanol with 4.5 gm. of 2-bromo-3,3-diethoxy-propionaldehyde in 63 ml. of ethanol.

EXAMPLE 5

Production of 2-amino-4-hydroxy-6-diethoxymethyl-5,6-dihydropteridine and 2-amino-4-hydroxy-6-diethoxymethyl pteridine 5.0 gm. of 2,4,5-triamino-6-hydroxy pyrimidine sulfate was dissolved in 140 ml. of water containing 5 gm. of barium chloride. The solution was heated to 60° C. in a nitrogen atmosphere for 1 hour with stirring and subsequently filtered hot to remove the insoluble precipitate.

To the resulting solution of 2,4,5-triamino-6-hydroxy pyrimidine was added 140 ml. of ethanol and then 5.14 gm. of 2-bromo-3,3-diethoxy-propionaldehyde. The reaction mixture was stirred under nitrogen at room temperature for 56 hours to yield a solution of 2-amino-4-hydroxy-6-diethoxymethyl-5,6-dihydropteridine. The solution was then adjusted to pH 8–9 and 50 mg. of ferrous chloride and 2.6 gm. of 30% hydrogen peroxide added at room temperature. The solution was stirred 5 hours, filtered, and the precipitate washed with water, alcohol, and ether to yield purified 2-amino-4-hydroxy-6-diethoxymethyl pteridine.

A sample was purified by conversion to the sodium salt and reprecipitation of the original free base. It had an ultraviolet absorption curve which exhibited maxima in 0.1 N HCl at 3180 A (E%=340) and in 0.1 N NaOH at 2550 A (E%=941), 3620 A (E%=288).

In a similar manner, 2-amino-4-hydroxy-6-diethoxymethyl pteridine was prepared by reacting 2-chloro-3,3-diethoxy-propionaldehyde with 2,4,5-triamino-6-hydroxy pyrimidine in ethanol and in the presence of sodium acetate to produce 2-amino-4-hydroxy-6-diethoxymethyl-5,6-dihydropteridine which was oxidized with hydrogen peroxide and ferrous sulfate to 2-amino-4-hydroxy-6-diethoxymethyl pteridine.

EXAMPLE 6

*Production of 2-amino-4-hydroxy-6-dibenzyloxymethyl-5,6-dihydropteridine and 2-amino-4-hydroxy-6-dibenzyloxymethyl pteridine*

After passing nitrogen through a stirred solution of 8.2 gm. of sodium acetate in a mixture of 200 ml. of ethanol for one-half hour, 4.7 gm. of 2,4,5-triamino-6-hydroxy pyrimidine dihydrochloride and 7.0 gm. of 2-bromo-3,3-dibenzyloxy-propionaldehyde were added to the solution. The reaction mixture was stirred overnight at room temperature, forming 2-amino-4-hydroxy-6-dibenzyloxymethyl-5,6-dihydropteridine in solution. About 0.1 gm. of ferrous sulfate was dissolved in 3 ml. of water and added to the reaction mixture together with 30 gm. of 10% hydrogen peroxide added dropwise. The reaction mixture was filtered after standing overnight to give 2-amino-4-hydroxy-6-dibenzyloxymethyl pteridine which is readily purified by preparation of its sodium salt and reprecipitation of the free base.

EXAMPLE 7

*Production of 2-acetamido-4-hydroxy-6-diethoxymethyl pteridine*

To a 3-necked flask equipped with stirrer and reflux condenser was added 4.2 gm. of 2-amino-4-hydroxy-6-diethoxymethyl pteridine and 80 ml. of acetic anhydride. The mixture was refluxed with stirring for 1.5 hours. To the solution was added 2 gm. of activated carbon and refluxing was continued for 10 minutes. The hot solution was filtered and cooled in the ice-box overnight. The crystalline precipitate which formed was filtered and washed with 10 ml. of cold acetic anhydride and then with ether. The precipitate was dried at 50° C. under reduced pressure to yield white crystalline 2-acetamido-4-hydroxy-6-diethoxymethyl pteridine. A 1 gm. sample of the product was recrystallized from 2 ml. of dioxane and melted at 198–200° C.

The ultraviolet absorption curve exhibited maxima in 0.1 N NaOH at 2560 A (E%=850) and 3500 A (E%=240).

EXAMPLE 8

*Production of 2 - propionamido - 4-hydroxy - 6 - diethoxymethyl pteridine*

A slurry of 3.5 gm. of 2-amino-4-hydroxy-6-diethoxymethyl pteridine in 70 gm. of propionic anhydride was heated at 140° C. for five hours during which time solution was effected. To the reaction mixture was added 1.5 gm. of charcoal and the mixture filtered. The filtrate was evaporated to about one-half volume and allowed to stand overnight in the cold. The solid was collected by filtration, washed twice with ethyl ether and twice with petroleum ether. After drying in air the light tan crystals of 2-propionamido-4-hydroxy-6-diethoxymethyl pteridine weighed 2.95 gm.

EXAMPLE 9

*Production of 2-acetamido-4-hydroxy-6-formyl pteridine*

To a flask equipped with a stirrer was added 860 ml. of 98% formic acid and 58 gm. of 2-acetamido-4-hydroxy-6-diethoxymethyl pteridine. Complete solution was achieved in 5 minutes. Upon standing for 15 minutes at room temperature a precipitate appeared. The solution was allowed to stand under nitrogen in an icebox overnight. It was filtered and the precipitate was washed with cold formic acid and then anhydrous ether giving a formic acid salt of 2-acetamido-4-hydroxy-6-formyl pteridine.

The ultraviolet absorption curve exhibited maxima in 0.1 N NaOH at 2550 A (E%=809) and 3500 A (E%=294). The salt loses formic acid when heated at 100° C. for three hours at 3 mm. pressure.

EXAMPLE 10

*Production of N-{p-[(2-acetamido-4-hydroxy-6-pteridylmethylene) imino] benzoyl} glutamic acid*

To a 1 liter flask equipped with stirrer and reflux condenser containing 660 ml. of ethanol was added 6.6 gm. of L(-1)N-(p-aminobenzoyl) glutamic acid. The mixture was refluxed in a nitrogen atmosphere until solution was complete (20 minutes). At this point 5.3 gm. of 2-acetamido-4-hydroxy-6-formyl pteridine was added. Refluxing and stirring were continued for 1 hour during which the aldehyde dissolved. The solution was filtered while hot and allowed to stand overnight at room temperature. A yellow crystalline precipitate formed which was filtered and dried under reduced pressure at 100° C. to remove absorbed solvent to product N-{p-[(2-acetamido-4-hydroxy-6-pteridylmethylene) imino] benzoyl} glutamic acid.

The ultraviolet absorption curve exhibited maxima in 0.1 N NaOH at 2580 A (E%=627), inflection 2750 A (E%=505), and 3500 A (E%=156).

EXAMPLE 11

*Production of $N^2$-acetyl-$N^{10}$-formyl pteroylglutamic acid*

A mixture of 100 ml. of 98% formic acid and 11.2 gm. of acetic anhydride was prepared and allowed to stand overnight. To 1 gm. of N-{p-[(2-acetamido-4-hydroxy-6-pteridylmethylene) imino] benzoyl} glutamic acid was added 18 ml. of the formic acid-acetic anhydride mixture. The resulting yellow solution was heated at 67° C. for 1 hour during which time the solution became reddish. The solution was cooled to room temperature and combined with 200 ml. of anhydrous ether. A reddish precipitate formed which was filtered and washed well with ether without exposing it to the atmosphere. The resulting $N^2$-acetyl-$N^{10}$-formyl pteroylglutamic acid was dried under reduced pressure.

EXAMPLE 12

*Production of $N^2$-acetyl-$N^{10}$-formyl pteroylglutamic acid by reduction of N-{p-[(2-acetamido-4-hydroxy-6-pteridylmethylene) imino] benzoyl} glutamic acid with triethyl ammonium formate*

A mixture of 0.96 gm. of N-{p-[(2-acetamido-4-hydroxy-6-pteridylmethylene) imino] benzoyl} glutamic acid in 7.0 gm. of triethyl ammonium formate was heated at 150° C. for two hours. After standing overnight at room temperature, the reaction mixture was diluted with 100 ml. of water and cooled in the refrigerator for several hours. The $N^2$-acetyl-$N^{10}$-formyl pteroylglutamic acid was recovered by filtration and washed with water, acetone, and ether. The product was assayed with *L. casei* and found to possess folic acid activity.

EXAMPLE 13

*Production of $N^2$-acetyl-$N^{10}$-formyl pteroylglutamic acid by condensing 2-acetamido-4-hydroxy-6-formyl pteridine with L(-1)N-(p-aminobenzoyl) glutamic acid in dioxane in the presence of formic acid*

To a boiling solution of 60 ml. of dioxane was added 600 mg. of L(-1)N-(p-aminobenzoyl) glutamic acid and 400 mg. of 2-acetamido-4-hydroxy-6-formyl pteridine and the mixture refluxed until solution was complete. To the mixture was added a solution of 18 ml. of formic acid and 3 ml. of acetic anhydride. The reaction mixture was refluxed for one hour, cooled, and 300 ml. of ether added to precipitate the $N^2$-acetyl-$N^{10}$-formyl pteroylglutamic acid. It was filtered, washed with ether and dried. The product assayed 59% folic acid against L. casei.

EXAMPLE 14

Production of $N^2$-acetyl-$N^{10}$-formyl pteroylglutamic acid by condensing 2-acetamido-4-hydroxy-6-formyl pteridine with L(-1)N-(p-formamidobenzoyl) glutamic acid To a solution of 400 mg. of 2-acetamido-4-hydroxy-6-formyl pteridine in 18 ml. of 98% formic acid containing a small amount of acetic anhydride was added 600 mg. of L(-1)N-(p-formamidobenzoyl) glutamic acid. The mixture was heated at 65-70° C. for one hour and then cooled. To this solution was added 200 ml. of ether to precipitate $N^2$-acetyl-$N^{10}$-formyl pteroylglutamic acid. The solid was filtered, washed with ether and dried. The product possessed folic acid activity to L. casei.

The L(-1)N-(p-formamidobenzoyl) glutamic acid used in this reaction was produced by heating 10 gm. of L(-1)N-(p-aminobenzoyl) glutamic acid in 25 ml. of 85% formic acid for one hour. On cooling a white precipitate of L(-1)N-(p-formamidobenzoyl) glutamic acid separated which was filtered, washed with ether and dried. It melted at 190° C.

EXAMPLE 15

Production of $N^2$-acetyl-$N^{10}$-formyl pteroylglutamic acid directly from 2-acetamido-4-hydroxy-6-diethoxymethyl pteridine To 36 ml. of 98% formic acid at room temperature was added 1 gm. of 2-acetamido-4-hydroxy-6-diethoxymethyl pteridine and 1.80 gm. of L(-1)N-(p-aminobenzoyl) glutamic acid. The mixture was heated to 70° C. and solution effected. After heating at 70-75° C. for 1 hour the reaction mixture was cooled and poured into 500 ml. of ether. The $N^2$-acetyl-$N^{10}$-formyl pteroylglutamic acid precipitated from solution and was filtered and washed with ether. The product was dried under reduced pressure.

EXAMPLE 16

Production of $N^{10}$-formyl pteroylglutamic acid

To 35 ml. of formic acid was added 1.86 gm. of 2-amino-4-benzyloxy-6-diethoxymethyl pteridine, and 1.4 gm. of L(-1)N-(p-aminobenzoyl) glutamic acid. The reactants dissolved readily to give a dark red solution which was heated at 67° C. for one hour. The reaction mixture was cooled to 20° C. and poured into 400 ml. of ether with stirring. The resulting precipitate was washed with formic acid, ether, water, and ether. The product obtained contained $N^{10}$-formyl pteroylglutamic acid and had 23% folic acid activity when assayed with S. faecalis.

EXAMPLE 17

Production of $N^{10}$-formyl pteroylglutamic acid by reacting 2 - amino - 4 - hydroxy - 6 - formyl pteridine with L(-1)N-(p-aminobenzoyl) glutamic acid in triethyl ammonium formate A mixture of 1.0 gm. of 2-amino-4-hydroxy-6-formyl pteridine, 1.4 gm. of L(-1)N-(p-aminobenzoyl) glutamic acid, and 15 gm. of triethyl ammonium formate was heated at 150° C. for one hour. The reaction mixture was concentrated under reduced pressure below 100° C. and diluted with 100 ml. of water. The $N^{10}$-formyl pteroylglutamic acid precipitated from the reaction mixture and was recovered by filtration. It was washed with water, acetone, and ether and dried in air. The product has folic acid activity when assayed with L. casei and S. faecalis.

EXAMPLE 18

Production of $N^2$-acetyl-$N^{10}$-formyl pteroylglutamic acid by reacting 2-acetamido-4-hydroxy-6-formyl pteridine with L(-1)N-(p-aminobenzoyl) glutamic acid in triethyl ammonium formate To a solution of 466 mg. of 2-acetamido-4-hydroxy-6-formyl pteridine in 13 ml. of triethyl ammonium formate was added 600 mg. of L(-1)N-(p-aminobenzoyl) glutamic acid. The mixture was heated to 150° C. for one hour and then concentrated under reduced pressure. About 100 ml. of acetone was added to the concentrate and a precipitate formed. The $N^{10}$-formyl pteroylglutamic acid was recovered by filtration and washed with acetone and ether and dried. It was found to have folic acid activity when assayed with L. casei.

EXAMPLE 19

Production of $N^2$-acetyl pteroylglutamic acid by catalytic reduction of N-{p-[(2-acetamido-4-hydroxy-6-pteridylmethylene) imino] benzoyl} glutamic acid To 40 ml. of water was added 0.96 gm. of N-{p-[(2-acetamido-4-hydroxy-6-pteridylmethylene) imino] benzoyl} glutamic acid, 1.0 gm. of sodium bicarbonate, and 1.0 gm. of Raney nickel. The mixture was hydrogenated at room temperature under 40 pounds per square inch pressure. After one molar equivalent of hydrogen had been absorbed the catalyst was removed by filtration. The filtrate was acidified with 6 ml. of glacial acetic acid. The mixture was allowed to stand in the cold overnight. It was centrifuged and the solid $N^2$-acetyl pteroylglutamic acid was washed with water, ethanol and ether.

EXAMPLE 20

Production of p-[N-(2-amino-4-hydroxy-6-pteridylmethyl) formamido] benzoic acid

To 115 ml. of formic acid was added 3.5 gm. of 2-amino-4-benzyloxy-6-diethoxymethyl pteridine and 1.4 gm. of p-aminobenzoic acid. The mixture was heated at 67° C. for 1 hour, cooled, and added to 1 liter of ether with stirring. The reaction mixture was centrifuged and the precipitate recovered. It was washed with alcohol, ether and then dried to produce p-[N-(2-amino-4-hydroxy-6-pteridylmethyl) formamido] benzoic acid.

1 gm. of p-[N-(2-amino-4-hydroxy-6-pteridylmethyl) formamido] benzoic acid and 5 gm. of sodium bicarbonate were added to 35 ml. of water. The mixture was heated on a steam bath with shaking for 10 minutes. The reaction mixture was filtered hot. To the filtrate, acetic acid was added until the solution was acidic. The mixture was centrifuged and the solid washed and dried to produce purified p - [N - (2 - amino - 4-hydroxy-6-pteridylmethyl) formamido] benzoic acid as a yellowish powder.

The product had an ultraviolet absorption spectrum in 0.1 N NaOH with maxima at 2560 A (E%=479) and 3630 A (E%=200) and in 0.1 N HCl at 2480 A (E%=311) and 3170 A (E%=205).

The product had a microbiological activity of 300 γ/mg. against S. faecalis.

EXAMPLE 21

Hydrolysis of 2-acetamido-4-hydroxy-6-diethoxy methyl pteridine to 2-acetamido-4-hydroxy-6-formyl pteridine in 2.5 N HCl.

5 grams of 2-acetamido-4-hydroxy-6-diethoxymethyl pteridine was added all at once to a stirred solution of 100 ml. of 2.5/N HCl. Solution of the solid occurred and then a precipitate of 2-acetamido-4-hydroxy-6-formyl pteridine deposited. This precipitate was filtered and washed with water, acetone and ether.

EXAMPLE 22

*Production of N - {p-[(2-acetamido-4-hydroxy-6-pteridyl-methylene) imino] benzoyl} glutamic acid-condensation in dioxane*

1.8 grams of p-aminobenzoyl glutamic acid and 180 ml. of dioxane were refluxed until all solid dissolved. To this solution while hot was added 1.4 grams of 2-acetamido-4-hydroxy-6-formyl pteridine. On refluxing for 25 minutes practically all the solid dissolved. The solution was filtered from some insolubles. On standing at room temperature a yellow precipitate of N-{p-[(2-acetamido-4-hydroxy-6-pteridylmethylene) imino] benzoyl} glutamic acid came down. This was filtered and dried at 100° C./2 mm.

Various changes and modifications of the invention can be made and, to the extent that such variations incorporate the spirit of this invention, they are intended to be included within the scope of the appended claims.

What is claimed is:

1. The process which comprises reacting L(-1)N-(p-aminobenzoyl) glutamic acid with formic acid in a liquid reaction medium to produce L(-1)N-(p-formamidobenzoyl) glutamic acid and reacting said compound with a 2-acylamino-4-hydroxy-6-formyl pteridine to produce the corresponding $N^2$-acyl-$N^{10}$-formyl pteroylglutamic acid, said acyl group being a lower aliphatic carboxylic acid radical.

2. The process which comprises reacting L(-1)N-(p-aminobenzoyl) glutamic acid with formic acid in a liquid reaction medium to produce L(-1)N-(p-formamidobenzoyl) glutamic acid and reacting said compound with 2-acetamido-4-hydroxy-6-formyl pteridine to produce $N^2$-acetyl-$N^{10}$-formyl pteroylglutamic acid.

3. L(-1)N-(p-formamidobenzoyl) glutamic acid.

4. The process which comprises reacting L(-1)N-(p-aminobenzoyl) glutamic acid with formic acid in a liquid reaction medium to produce L(-1)N-(p-formamidobenzoyl) glutamic acid.

5. The process which comprises reacting L(-1)N-(p-formamidobenzoyl) glutamic acid with a 2-acylamino-4-hydroxy-6-formyl pteridine to produce $N^2$-acetyl-$N^{10}$-formyl pteroylglutamic acid, said acyl group being a lower aliphatic carboxylic acid radical.

6. The process which comprises reacting L(-1)N-(p-formamidobenzoyl) glutamic acid with 2-acetamido-4-hydroxy-6-formyl pteridine to produce $N^2$-acetyl-$N^{10}$-formyl pteroylglutamic acid.

References Cited in the file of this patent

UNITED STATES PATENTS

| | | |
|---|---|---|
| 2,515,483 | Wolf et al. | July 18, 1950 |
| 2,520,156 | Lindlar et al. | Aug. 29, 1950 |
| 2,540,274 | McPherson et al. | Feb. 6, 1951 |

FOREIGN PATENTS

| | | |
|---|---|---|
| 904,289 | Germany | Feb. 18, 1954 |

OTHER REFERENCES

G. H. Richter: Textbook of Organic Chemistry (1st ed., 1938), pp. 124 and 275.

Wolf et al.: J. Am. Chem. Soc., 69, 2753–2759 (1947).

UNITED STATES PATENT OFFICE

CERTIFICATE OF CORRECTION

Patent No. 2,791,586 — May 7, 1957

Meyer Sletzinger et al.

It is hereby certified that error appears in the printed specification of the above numbered patent requiring correction and that the said Letters Patent should read as corrected below.

Column 18, line 11, for "$N^2$-acetyl-$N^{10}$-" read -- $N^2$-acyl-$N^{10}$- --.

Signed and sealed this 18th day of June 1957.

(SEAL)
Attest:
KARL H. AXLINE

Attesting Officer

ROBERT C. WATSON
Commissioner of Patents